(12) United States Patent
Panneer et al.

(10) Patent No.: US 10,013,731 B2
(45) Date of Patent: Jul. 3, 2018

(54) MAXIMIZING PARALLEL PROCESSING IN GRAPHICS PROCESSORS

(75) Inventors: Selvakumar Panneer, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 13/174,116

(22) Filed: Jun. 30, 2011

(65) Prior Publication Data
US 2013/0002689 A1    Jan. 3, 2013

(51) Int. Cl.
*G06T 1/20*    (2006.01)

(52) U.S. Cl.
CPC ..................... *G06T 1/20* (2013.01)

(58) Field of Classification Search
CPC .... G09G 5/363; G09G 5/393; G09G 2360/06; G06T 1/20; G06T 15/005
See application file for complete search history.

(56) References Cited

U.S. PATENT DOCUMENTS

| | | | | |
|---|---|---|---|---|
| 5,861,893 | A * | 1/1999 | Sturgess | 345/562 |
| 6,002,409 | A * | 12/1999 | Harkin | 345/506 |
| 6,078,339 | A * | 6/2000 | Meinerth | G06T 1/20 345/502 |
| 8,368,701 | B2 | 2/2013 | Paltashev et al. | |
| 2003/0164833 | A1* | 9/2003 | Walls et al. | 345/506 |
| 2007/0091102 | A1 | 4/2007 | Brothers et al. | |
| 2008/0094404 | A1 | 4/2008 | Bakalash et al. | |
| 2008/0117218 | A1 | 5/2008 | Bakalash et al. | |
| 2008/0168479 | A1* | 7/2008 | Purtell et al. | 719/328 |
| 2008/0192057 | A1 | 8/2008 | Prokopenko et al. | |
| 2009/0027402 | A1* | 1/2009 | Bakalash et al. | 345/505 |
| 2010/0110083 | A1 | 5/2010 | Paltashev et al. | |
| 2010/0164965 | A1* | 7/2010 | Barone et al. | 345/506 |
| 2011/0022817 | A1* | 1/2011 | Gaster et al. | 711/202 |
| 2011/0161976 | A1* | 6/2011 | Alexander et al. | 718/104 |
| 2012/0001930 | A1* | 1/2012 | Iwaki et al. | 345/547 |
| 2012/0050259 | A1* | 3/2012 | Solomonov et al. | 345/419 |
| 2012/0291040 | A1* | 11/2012 | Breternitz et al. | 718/104 |

FOREIGN PATENT DOCUMENTS

| | | |
|---|---|---|
| CN | 101719262 A | 6/2010 |
| WO | 2013/003645 A2 | 1/2013 |

OTHER PUBLICATIONS

Shreiher, Dave, The Khronos OpenGL ARB Working Group, OpenGL® Programming Guide: The Official Guide to Learning OpenGL®, Versions 3.0 and 3.1, Jul. 21, 2009, Addison-Wesley Professional, Seventh Edition, p. 496.*

(Continued)

*Primary Examiner* — Tize Ma
(74) *Attorney, Agent, or Firm* — Jordan IP Law, LLC

(57) ABSTRACT

Methods and systems may include a computing system having a graphics processor with a three-dimensional (3D) pipeline, one or more processing units, and compute kernel logic to process two-dimensional (2D) command. A graphics processing unit (GPU) scheduler may dispatch the 2D command directly to the one or more processing units. In one example, the 2D command includes at least one of a render target clear command, a depth-stencil clear command, a resource resolving command and a resource copy command.

20 Claims, 3 Drawing Sheets

(56) References Cited

OTHER PUBLICATIONS

International Search Report and Written Opinion received for PCT application No. PCT/US2012/044737, dated Dec. 14, 2012, 13 pages.
International Report on Patentability dated Jan. 16, 2014 for International Patent Application No. PCT/US2012/044737, 6 pages.

\* cited by examiner

MAXIMIZING PARALLEL PROCESSING IN GRAPHICS PROCESSORS

BACKGROUND

Visually intensive computer graphics applications such as 3D (three-dimensional) computer games, flight simulators and other 3D imaging applications may involve user interaction, scene management and rendering, physics modeling, artificial intelligence and other relatively complex functions. While certain game applications can leverage the capabilities of a local GPU (graphics processing unit) by offloading graphical and non-graphical computation to the GPU in order to maintain interactive frame rates, there remains considerable room for improvement. For example, conventional approaches may use a 3D pipeline of the GPU for 2D (two-dimensional) operations such as clearing the color of render targets. Each time such a clear color operation is processed in the 3D pipeline, the 3D state may need to be saved and restored once the clear color operation processing is complete. As a result, system stalls could occur during the 3D processing of commands, particularly in non-optimized application environments in which render target clear operations occur frequently. Currently, compute kernels can be programmed only on specific GPUs that support application programming interfaces (APIs) such as DX11 (DirectX 11, Microsoft Corporation) and OpenCL (Khronos Group), whereas device drivers can use the compute kernels irrespective of the application API calls as long as the GPU supports compute kernels.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
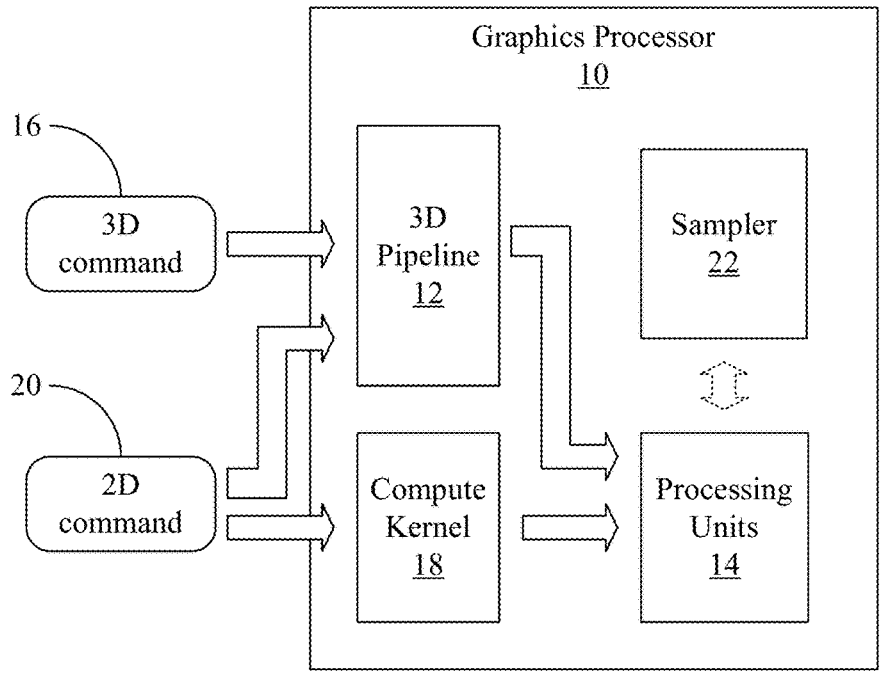
FIG. 1 is a block diagram of an example of a graphics processor according to an embodiment.

Turning now to FIG. 1, a graphics processor 10 having a 3D (three-dimensional) pipeline 12, a compute kernel (e.g., shader) 18, a sampler 22, and one or more processing units 14 is shown. The 3D pipeline 12, which may be used to process complex graphics commands such as a 3D command 16 involving one or more graphical computations, can include logic (e.g., fixed functionality hardware, programmable hardware, firmware, micro-code, etc.) for various functions such as input assembly, vertex shader, geometry shader, rasterization, and pixel shader functions. The compute kernel 18, on the other hand, may be a programmable stage that works in conjunction with the processing units 14 to provide high speed general purpose computing, wherein the processing units 14 can include a large number of processing cores capable of operating in parallel. In one example, the compute kernel 18 is a Direct3D (e.g., Microsoft DirectX application programming interface/API) construct. The compute kernel 18 may also extend to compute kernels from other parallel languages (e.g., OpenGL, OpenCL, Cuda) that target graphics processor hardware and mix compute operations with graphics operations.

In the illustrated example, upon receipt of a 2D (two-dimensional) command 20, the graphics processor 10 uses the compute kernel 18 to dispatch the 2D command 20 directly to the processing units 14. Thus, the dispatch of the 2D command may bypass the 3D pipeline 12 and enable the 3D command 16 and the 2D command 20 to be processed by the graphics processor 10 asynchronously and in parallel with one another. Such an approach can enable maximization of silicon area usage and may increase overall graphics performance.

The 2D command 20 could include a clear color command, resource resolving command to resolve a multi-sampled resource to a single sampled resource, resource copy command, and so on. For example, the clear color command might involve clearing the color of a render target and/or depth-stencil buffer. In particular, a render target clear command may change/clear the color of a frame buffer where pixels are drawn for a scene that is being rendered. Generally, depth-stencil buffers may be used to track the depth of pixels and mask objects from scenes. For example, a depth-stencil buffer could be used to overwrite 3D scene pixels that are relatively far away from the viewer with pixels that are closer to the viewer. In addition, a depth-stencil buffer might be used to select specific regions of a scene for color changes. Thus, depth-stencil clear commands can be used to provide color support to more complex rendering activities such as shadow rendering or outline rendering.

Resource resolving commands may enable scene edges to be smoothed out for multi-sampled anti-aliased resources (e.g., 8× milti-sampled resource) in which multiple samples are generated per pixel on triangle edges.

Resource copy commands may support, for example, the transfer of data from one buffer to another. In particular, the illustrated approach obviates the need to use the sampler 22 in conjunction with the pixel shader and/or other functionality of the 3D pipeline 12 when conducting resource copy operations.

Figure 2A:
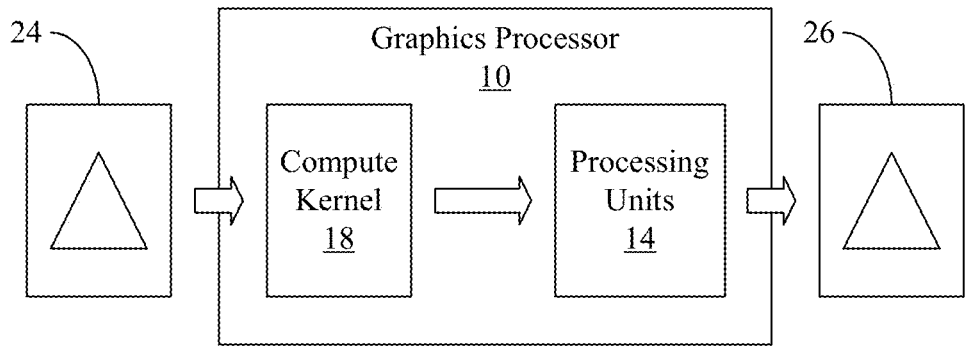
FIG. 2A is a block diagram of an example of the processing of a resource copy operation according to an embodiment.

FIG. 2A shows an example in which a resource copy command is used to transfer data (e.g., 2D image—triangle in the example shown) from a first memory array (e.g., buffer) 24 to a second memory array (e.g., buffer) 26. The memory arrays 24, 26 could be frame buffers, caches or other suitable memory space capable of storing a 2D grid of pixel data. In the illustrated example, the compute kernel 18 dispatches the resource copy command directly to the processing units 14 without using the sampler 22 (FIG. 1) or the 3D pipeline 12 (FIG. 1), as already discussed. As a result, the processing setup, and/or state management overhead associated with the resource copy command can be substantially reduced.

Figure 2B:
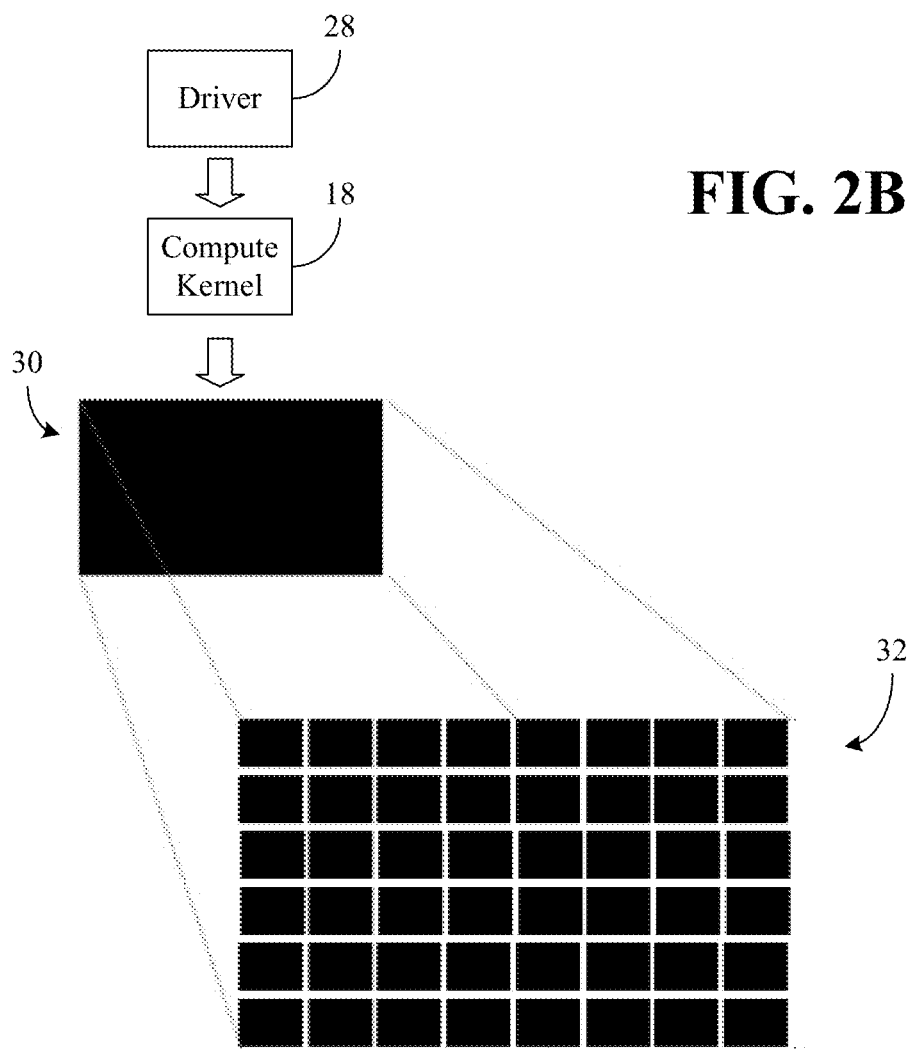
FIG. 2B is a block diagram of an example of the processing of a render target clear operation according to an embodiment.

FIG. 2B shows an example in which a clear color command is used to change the color of a 2D render target 30 to black. In the illustrated example, a driver 28 sets up a compute kernel 18, and binds the render target 30 to the compute kernel 18 as an unordered access view (UAV), wherein the compute kernel 18 executes a dispatch command in order to distribute the clear color command across a set of processing units in parallel. The set of processing units could include some or all of the available processing units. In particular, the work may be split into multiple smaller thread groups 32 of optimal dimension M×N thread groups—and assigned to available processing units for parallel processing. In particular, a compute kernel can work on multiple thread groups simultaneously, where each thread group is a collection of threads defined in 3-dimensional order. For example, the dimension 4×3×2 may refer to twenty-four threads within a thread group having a 3-dimensional index (x, y, z), where x ranges from zero to three, y ranges from zero to two, and z ranges from zero to one. Accordingly, the illustrated approach eliminates any need to save or restore the 3D pipeline state, since the 3D pipeline and the compute kernel 18 are mutually exclusive.

Figure 3:
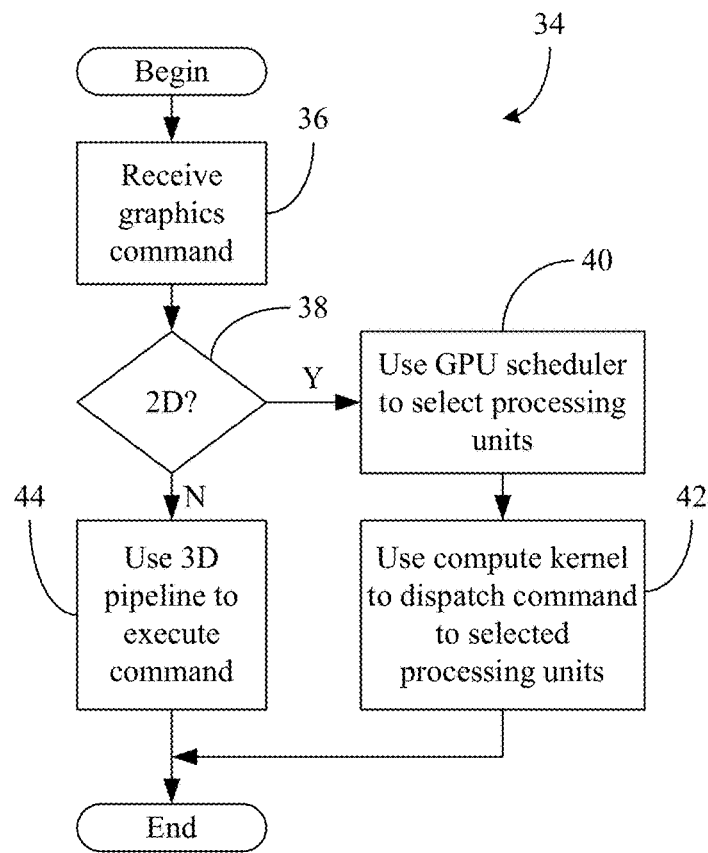
FIG. 3 is a flowchart of an example of a method of processing graphics commands according to an embodiment.

Turning now to FIG. 3, a method 34 of processing graphics commands is shown. The method 34 may be implemented as a set of executable logic instructions stored in a machine- or computer-readable storage medium such as random access memory (RAM), read only memory (ROM), programmable ROM (PROM), flash memory, firmware, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 34 may be written in any combination of one or more programming languages, including an object oriented programming language such as C++ or the like and conventional procedural programming languages, such as the "C" programming language or similar programming languages. Moreover, various aspects of the method 34 could be implemented as embedded logic of a graphics processor using any of the aforementioned circuit technologies.

Processing block 36 provides for receiving a graphics command, and block 38 determines whether the graphics command is a 2D command. As already discussed, a 2D command might include a clear command, resource resolving command, resource copy command, etc. If the received command is a 2D command, illustrated block 40 uses compute kernel logic to select one or more processing units of a graphics processor from a plurality of processing units. As already noted, the selected processing units may include some or all of the processing units of the graphics processor. The selection process could involve an identification of which processing units are available, as well as a determination of how much processing capacity is needed for the 2D command. In addition, block 42 may use a compute kernel to dispatch the 2D command to the selected processing units of the graphics processor, wherein the dispatch distributes the 2D command across the selected processing units of the graphics processor. If the graphics command is not a 2D command, the 3D pipeline of the graphics processor may be used to execute the graphics command at block 44.

Figure 4:
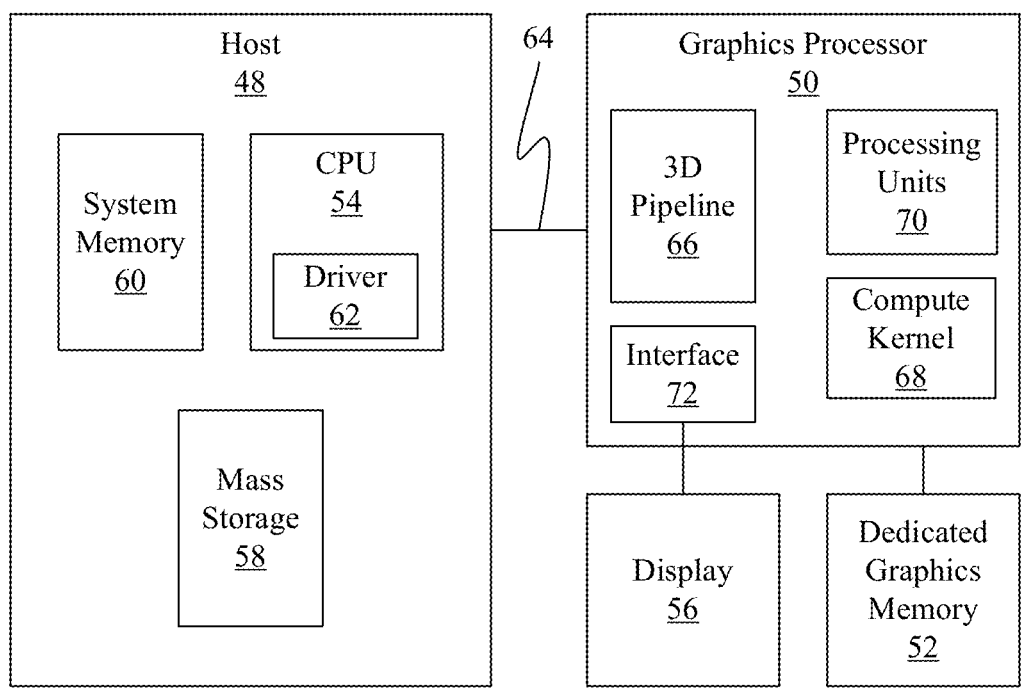
FIG. 4 is a block diagram of an example of a computing system according to an embodiment.

FIG. 4 shows a computing system 46 having a host platform 48, a graphics processor 50 and dedicated graphics memory 52 such as a graphics double data rate (GDDR) memory. In particular, the computing system 46 may be part of a mobile platform such as a laptop, personal digital assistant (PDA), wireless smart phone, media player, imaging device, mobile Internet device (MID), any smart device such as a smart phone, smart tablet, smart TV and so forth, or any combination thereof. The computing system 46 may also be part of a fixed platform such as a personal computer (PC), server, workstation, etc. The illustrated host platform 48 includes one or more CPUs 54, a display device 56, mass storage (e.g., hard disk drive, optical drive, etc.) 58 and system memory 60, which could include, for example, DDR synchronous dynamic random access memory (SDRAM, e.g., DDR3 SDRAM JEDEC Standard JESD79-3C, April 2008) modules. The modules of the system memory 60 may be incorporated into a single inline memory module (SIMM), dual inline memory module (DIMM), small outline DIMM (SODIMM), and so on.

The host platform 48 may include a graphics bus (e.g., slot) 64, wherein a graphics card (not shown) containing the graphics processor 50 and dedicated graphics memory 52 could be coupled (e.g., plugged into) the graphics bus 64. For example, the graphics bus 64 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so forth. The CPUs 54 may have processor cores (not shown) to execute one or more drivers 62 associated with a host OS (operating system) and/or application software, where each core may be fully functional with instruction fetch units, instruction decoders, level one (L1) cache, execution units, and so on. Generally, the drivers 62 may include API extensions that enable 3D commands and 2D commands to be issued to the graphics processor 50 for execution in conjunction with graphics related software running on the host platform 48. The graphics related software may include computer graphics applications such as 3D computer games, flight simulators and other 3D imaging applications.

Upon receipt of the commands, the illustrated graphics processor 50 identifies the type of command received and determines whether to use a 3D pipeline 66 or a compute kernel 68 and one or more processing units 70 to process the commands. For example, if a received command is a 2D command such as a clear command, resource resolving command, or resource copy command, the compute kernel 68 and processing units 70 may be used to process the command. If, on the other hand, the command is a 3D command, the 3D pipeline 66 might be used to process the command. Data associated with the execution of the 2D commands and/or 3D commands (e.g., pixel data, hardware commands) may be stored in/sent to a display interface 72 associated with the display device 56, wherein display outputs can be generated based on the data in the display interface 72. The display interface 72 may therefore also include a frame buffer.

Thus, the illustrated computing system 46 enables 2D operations to be rendered in existing processor graphics silicon without the need for setup and utilization of the 3D pipeline 66 or the need for silicon that is dedicated to 2D operations. For example, 3D pipeline clear color command processes that may be eliminated include, but are not limited to, saving the application states of the 3D pipeline 66, setting up vertex/index buffers for a four-sided shape (e.g., "quad") used to cover one or more render targets, binding vertex/geometry/pixel shaders, binding rasterizer and output merger states, setting up viewport/scissor rectangles, binding one or more render targets as color buffers, executing draw commands, and restoring the 3D pipeline 66 back to previous application states. Additionally, the compute kernel 68 path can eliminate the need for using a texture sampler to conduct resource copies. Use of the compute kernel 68 path can enable greater utilization of the processing units 70, wherein fine-tuning is possible based on thresholds such as maximum processing unit thresholds. Moreover, the command setup time for 2D operations may be far less compared to the setup time of the 3D pipeline 66.

Embodiments may therefore include a computer readable storage medium having a set of compute kernel instructions which, if executed by a graphics processor, cause a computer to receive a two-dimensional (2D) command. The compute kernel instructions may also cause a computer to dispatch the 2D command directly to one or more processing units of a graphics processor having a three-dimensional (3D) pipeline.

Embodiments may also include a system having a graphics processor with a 3D pipeline, one or more processing units, and compute kernel logic. The compute kernel logic may be configured to receive a 2D command and dispatch the 2D command directly to the one or more processing units. The system can also include a display interface configured to receive data associated with an execution of the 2D command by the one or more processing units, and a display device to generate a display output based on the data in the display interface.

Other embodiments can involve a computer implemented method in which a 2D command is received and a graphics processor executes compute kernels to process the 2D commands. The method may also provide for using the compute kernel logic to dispatch the 2D command directly to the one or more graphics processor units. The dispatch of the 2D command can distribute the 2D command across the one or more processing units of a graphics processor and bypass a 3D pipeline of the graphics processor. The method may also provide for using the 3D pipeline to execute one or more 3D commands in parallel with an execution of the 2D command by the one or more processing units of a graphics processor. Data associated with the execution of the 2D command can be processed in the graphics processor, and an output may be generated based on the data associated with the 2D command.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer implemented method comprising:
performing a determination, by a graphics processor, of a type of graphics command received at the graphics processor to identify the graphics command as either a two-dimensional (2D) command or a three-dimensional (3D) command before the graphics command reaches a pipeline of the graphics processor;
using, by the graphics processor and based on the determination, compute kernel logic to dispatch the 2D command directly to one or more processing units of the graphics processor, wherein the dispatch of the 2D command distributes the 2D command across the one or more processing units of the graphics processor and bypasses a 3D pipeline of the graphics processor, and wherein the compute kernel logic that dispatches the 2D command and the 3D pipeline are mutually exclusive to exclude the compute kernel logic from processing one or more 3D commands including dispatching one or more 3D commands;

using, by the graphics processor and based on the determination, the 3D pipeline to execute one or more of the 3D commands in parallel with an execution of the 2D command by the one or more processing units of the graphics processor;

processing data associated with the execution of the 2D command in the graphics processor; and generating an output based on the data associated with the 2D command.

2. The method of claim 1, wherein the 2D command includes at least one of a render target clear command and a depth-stencil clear command.

3. The method of claim 1, wherein the 2D command includes a resource resolving command.

4. The method of claim 1, wherein the 2D command includes a resource copy command.

5. A non-transitory computer readable storage medium comprising a set of instructions which, if executed by a graphics processor, cause a computer to:

perform a determination, by the graphics processor, of a type of graphics command received at the graphics processor to identify the graphics command as either a two-dimensional (2D) command or a three-dimensional (3D) command before the graphics command reaches a pipeline of the graphics processor, and use, by the graphics processor and based on the determination, compute kernel logic to dispatch the 2D command directly to one or more processing units of the graphics processor having a 3D pipeline, wherein the compute kernel logic that dispatches the 2D command and the 3D pipeline are to be mutually exclusive to exclude the compute kernel logic from processing one or more 3D commands including dispatching one or more 3D commands.

6. The medium of claim 5, wherein the dispatch of the 2D command by the compute kernel logic is to be a direct dispatch to the one or more processing units of the graphics processor to bypass the 3D pipeline.

7. The medium of claim 6, wherein the instructions, if executed, cause the graphics processor to use, based on the determination, the 3D pipeline to execute one or more of the 3D commands in parallel with an execution of the 2D command by the one or more processing units.

8. The medium of claim 5, wherein the instructions, if executed, cause the graphics processor to, process the 2D command directly on the one or more processing units of the graphics processor, wherein the one or more processing units are to be selected from a plurality of processing units via a graphics processor scheduler, and use the graphics processor scheduler to distribute one or more 2D commands and not one or more 3D commands across the one or more processing units of the graphics processor.

9. The medium of claim 5, wherein the 2D command is to include a clear color command.

10. The medium of claim 9, wherein the clear color command is to include at least one of a render target clear command and a depth-stencil clear command.

11. The medium of claim 5, wherein the 2D command is to include a resource resolving command.

12. The medium of claim 5, wherein the 2D command is to include a resource copy command.

13. A system comprising:

a graphics processor including a three-dimensional (3D) pipeline, one or more processing units, and compute kernel logic to, perform a determination, by the graphics processor, of a type of graphics command received at the graphics processor to identify the graphics command as either a two-dimensional (2D) command or a 3D command before the graphics command reaches a pipeline of the graphics processor, and use, by the graphics processor and based on the determination, the compute kernel logic to dispatch the 2D command directly to the one or more processing units, wherein the compute kernel logic that dispatches the 2D command and the 3D pipeline are to be mutually exclusive to exclude the compute kernel logic from processing one or more 3D commands including dispatching one or more 3D commands, a display interface to receive data associated with an execution of the 2D command by the one or more processing units, and a display device to generate a display output based on the data in the display interface.

14. The system of claim 13, wherein the dispatch of the 2D command by the compute kernel logic is to be a direct dispatch to the one or more processing units of the graphics processor to bypass the 3D pipeline.

15. The system of claim 14, wherein the 3D pipeline includes pipeline logic, to be used by the graphics processor based on the determination, to execute one or more of the 3D commands in parallel with the execution of the 2D command by the one or more processing units.

16. The system of claim 13, wherein the compute kernel logic is to, use scheduler logic to select the one or more processing units of the graphics processor from a plurality of processing units, and use the scheduler logic to distribute one or more 2D commands and not one or more 3D commands across the one or more processing units of the graphics processor.

17. The system of claim 13, wherein the 2D command is to include a clear color command.

18. The system of claim 17, wherein the clear color command is to include at least one of a render target clear command and a depth-stencil clear command.

19. The system of claim 13, wherein the 2D command is to include one or more of a resource resolving command and a resource copy command.

20. The system of claim 13, further including one or more drivers to allow the graphics command to be issued to the graphics processor, wherein the graphics processor is to identify the 2D command and the 3D command when the graphics command is received at the graphics processor.

* * * * *